INVENTORS
JOHN T. LUNENSCHLOSS
AND DU WANE J. BUSSE
BY Joseph G. Werner

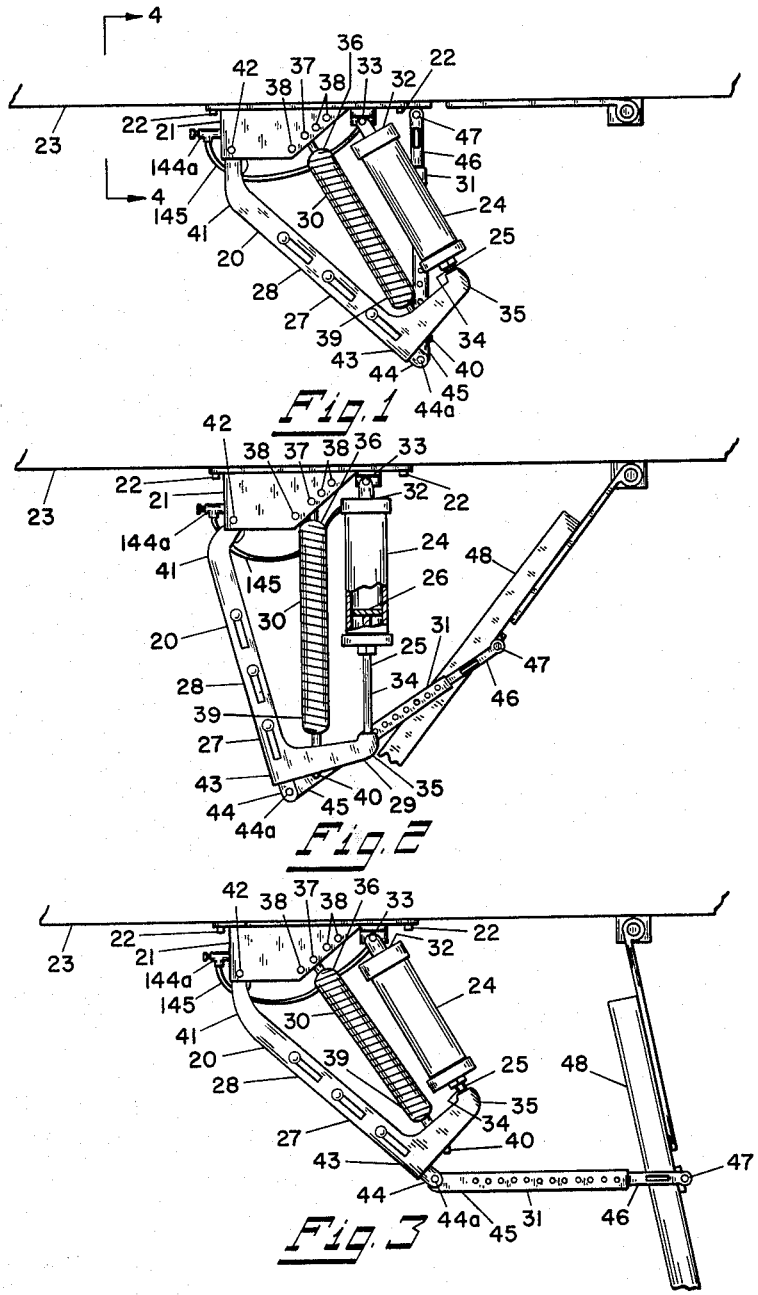

ATTORNEY

April 5, 1966   J. T. LUNENSCHLOSS ET AL   3,244,415
AUTOMATIC DOOR OPERATOR CONTROL SYSTEMS
Filed Nov. 14, 1963   7 Sheets-Sheet 3

INVENTORS
JOHN T. LUNENSCHLOSS
AND DU WANE J. BUSSE
BY
Joseph G. Werner
ATTORNEY April 5, 1966 J. T. LUNENSCHLOSS ET AL 3,244,415
AUTOMATIC DOOR OPERATOR CONTROL SYSTEMS
Filed Nov. 14, 1963 7 Sheets-Sheet 4

INVENTORS
JOHN T. LUNENSCHLOSS
AND DU WANE J. BUSSE
BY
ATTORNEY

April 5, 1966   J. T. LUNENSCHLOSS ET AL   3,244,415
AUTOMATIC DOOR OPERATOR CONTROL SYSTEMS
Filed Nov. 14, 1963   7 Sheets-Sheet 7

INVENTORS
JOHN T. LUNENSCHLOSS
AND DU WANE J. BUSSE
BY
Joseph G. Werner
ATTORNEY United States Patent Office 3,244,415
Patented Apr. 5, 1966

3,244,415
AUTOMATIC DOOR OPERATOR CONTROL
SYSTEMS
John T. Lunenschloss, 5430 Lake Mendota Drive, and
Du Wane J. Busse, 210 Glenway St., both of Madison,
Wis.
Filed Nov. 14, 1963, Ser. No. 323,723
3 Claims. (Cl. 268—50)

Our invention relates to improvements in automatic door operators, and more specifically to improvements in automatic door operator control systems.

It is a primary object of our invention to provide a novel control system for an automatic door operator which has a minimum number of moving parts, is economical to manufacture and which provides for efficient and reliable operation of the door operator.

It is a further object of our invention to provide such a control system which is easily adapted for use with several types of automatic door operators.

Other objects and advantages of our invention will be apparent from the following detailed description taken in conjunction with the accompanying drawings wherein a preferred embodiment of the principles of the invention has been selected for exemplification.

In the drawings:

FIG. 1 is a top view of one embodiment of an automatic door operator in its position when the door is closed.

FIG. 2 is a top view, partially in horizontal section, of the door operator of FIG. 1 when the door is approximately at the half-way point in its travel.

FIG. 3 is a top view of the door operator of FIG. 1 when the door is open.

FIG. 14 is a front view of the door operator of FIG. 12 when the door is open.

FIG. 15 is a schematic diagram of a pneumatic control system for the door operator of FIGS. 12 to 14.

FIG. 16 is a vertical section view of a valve which may be used in the pneumatic control systems of FIGS. 6 and 15.

Figure 4:
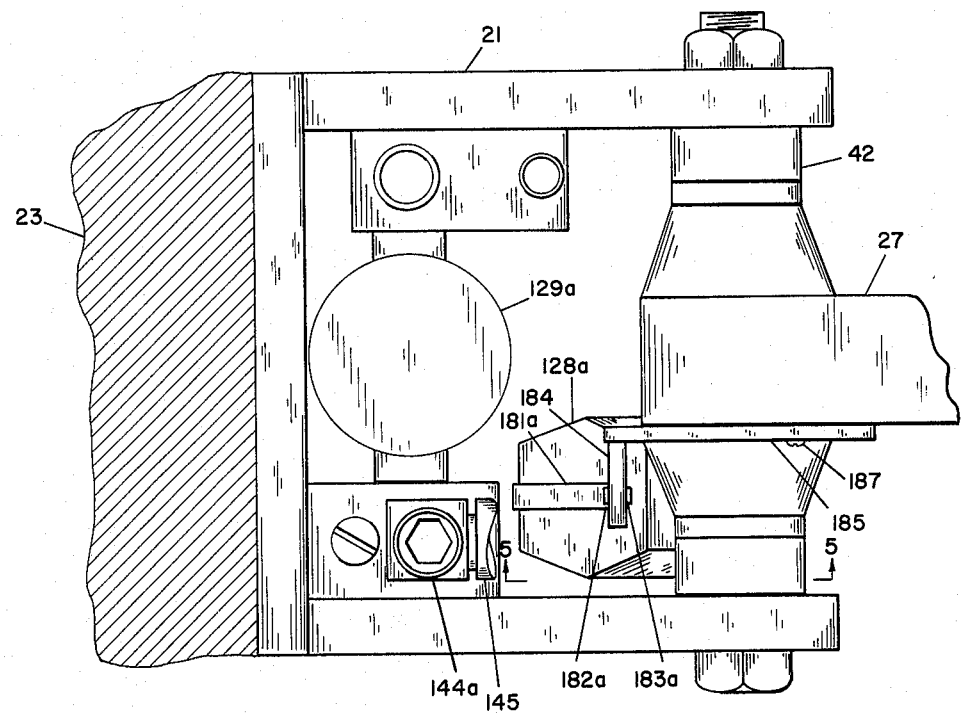
FIG. 4 is a partial end view of the door operator of FIG. 1 taken along section line 4—4.

Our invention may be adapted for use with any automatic door operator having as its essential working elements a cylinder and a piston. It is specifically described and illustrated for use with improved versions of three successful, commercially proven door operators; the swing operator of the general type shown in FIGS. 1–3; the over-center operator of the general type shown in FIGS. 7–9; and the inertia operator of the general type shown in FIGS. 12–14. The original version of the original version of the swing operator was first disclosed in United States Patent 1,716,707, issued January 11, 1929; the original version of the over-center operator in United States Patent 1,657,544, issued January 31, 1928; and the original version of the inertia operator in United States Patent 2,380,334, issued July 10, 1945.

The swing operator 20, which is schematically illustrated in FIGS. 1 to 5, may be adapted to both open and close any hinged door. A frame 21, which may be fixedly connected by bolts 22 or other similar means to a door frame or wall 23, is used to mount the working elements of the swing operator 20. Those working elements include a cylinder 24, a piston rod 25, a piston 26 slidably mounted within the cylinder 24, a substantially L-shaped main lever 27 having a longer leg 28 and a shorter leg 29, a spring 30, and a link 31 which is adjustable in length.

The inner end 32 of the cylinder 24 is pivotally secured to the frame 21 by a pin 33 or other similar means, and the outer end 34 of the piston rod is fixedly secured to the tip 35 of the shorter leg 29 of the main lever 27. The inner end 36 of the spring 30 is pivotally secured to the frame 21 by a pin 37 or other similar means inserted within one of the plurality of holes 38 in the frame 21. Its outer end 39 is adjustably secured to the shorter leg 29 of the main lever 27 with a screw 40 or other similar means that permits adjustment of the tension of the spring 30. The inner end 41 of the longer leg 28 of the main lever 27 is pivotally attached to the frame 21 by a shaft 42 or other similar means, while its outer end 43 carries a bar 44 pivotally connected to one end 45 of the link 31 by a pin 44a or other similar means. The other end 46 of the link 31 is pivotally connected to a hinged door 48 by a pin 47 or other similar means. Preferably, the link 31 is made adjustable in length by any suitable means, and the position of the bar 44 on the longer leg 28 of main lever 27 can be adjusted as desired.

The operation of the swing operator 20 in opening the door 48 is illustrated in FIGS. 1 to 3. In FIG. 1 the door 48 is closed and at rest. A fluid under pressure, preferably air, enters the cylinder 24 at its inner end 32 and begins to push the piston 26 and the piston rod 25 outwardly. The main lever 27 thereby pivots outwardly about the shaft 42, while simultaneously the link 31, pivoting at both the pins 44a and 47, pulls the doors 48 outward from the door frame. At approximately the half-way point in the travel of the door 48, the pressurized fluid is exhausted from the cylinder 24 to eliminate the force on the piston 26 and the piston rod 25. FIG. 2 illustrates the position of the swing operator 20 at the half-way point of its operation. The momentum of the door 48 and the tension given the spring 30 by the movement of the swing operator 20 to the position of FIG. 2 then complete the opening of the door to the position shown in FIG. 3 wherein the door 48 is open and at rest. A comparison of FIGS. 1 and 3 show that, except for the position of the link 31, all the elements of the swing operator 20 are in the same position when the door 48 is open as when the door is closed. The operation of the swing operator 20 in closing the door 48 is identical to that in opening it, except that the link 31 moves in the opposite direction.

Figure 10:
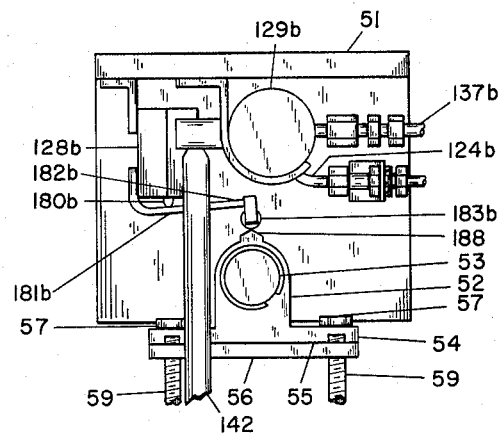
FIG. 10 is a detailed front view of the frame which mounts the door operator of FIGS. 7 to 9.

The over-center operator 50, shown in FIGS. 7 to 11, is adapted to both open and colse a sliding door. A frame 51, which may be attached to a wall or ceiling by any suitable means, supports the elements of the over-center operator 50. A bearing 52 is rotatably mounted on a substantially horizontal shaft 53 projecting from the frame 51. As best shown in FIG. 10, the bearing 52 has a flange 54 with a substantially flat, downwardly facing surface 55. A top plate 56 is attached by bolts 57 or other similar means to the surface 55 of the flange 54.

Figure 11:
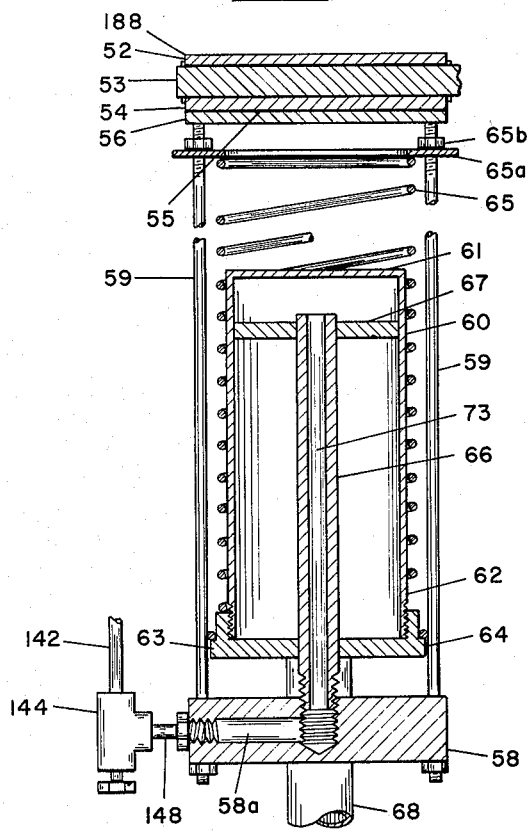
FIG. 11 is a partial section view taken along line 11—11 in FIG. 9.

Extending in fixed relation between the top plate 56 and a bottom manifold 58 are a plurality of circumferentially spaced rods 59. A cylinder 60 having a closed upper end 61 and an externally threaded lower end 62 is enclosed within the rods 59 in spaced relation thereto as best shown in FIG. 11. The lower end 62 of the cylinder 60 is threadedly engaged with a cap 63 having a flange 64 which is spaced from the rods 59. The cylinder 60 and the cap 63 are thus slidable between the rods 59. An adjusting ring 65a is carried by the rods 59, and a spring 65 extends between the flange 64 of the cap 63 and the adjusting ring 65a, and is enclosed by the rods 59. The tension in spring 65 may be changed by means of adjustment nuts 65b, may be adjusted to change the distance between the cap flange 64 and the adjusting ring. A tubular piston rod 66 carrying a piston 67 is preferably threadedly attached to the bottom manifold 58 and slidably projects through the cap 63. The bottom manifold 58 has a fluid passage 58a which communicates with the piston rod passage 73. A manifold inlet fitting 148 is threadedly attached to the manifold air passage 58a in air tight relation. A pair of bars 68 rigidly project from the slidable cap 63 and are pivotally connected to the door post 69 of a sliding door 70 by a bracket 71 or other similar means. The door 70 may be supported in slidable relation on a track 72 by means of rollers (not shown) attached to hangers 70a. The door 70 may be supported in slidable relation by any other suitable means, as desired.

Figure 7:
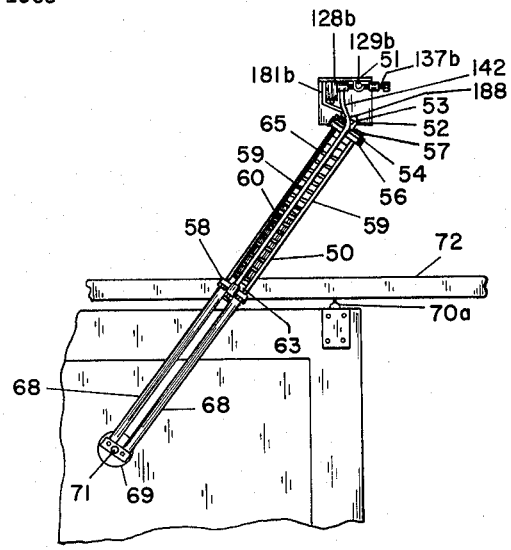
FIG. 7 is a front view of a second embodiment of an automatic door operator in its position when the door is closed.
Figures 8, 9:
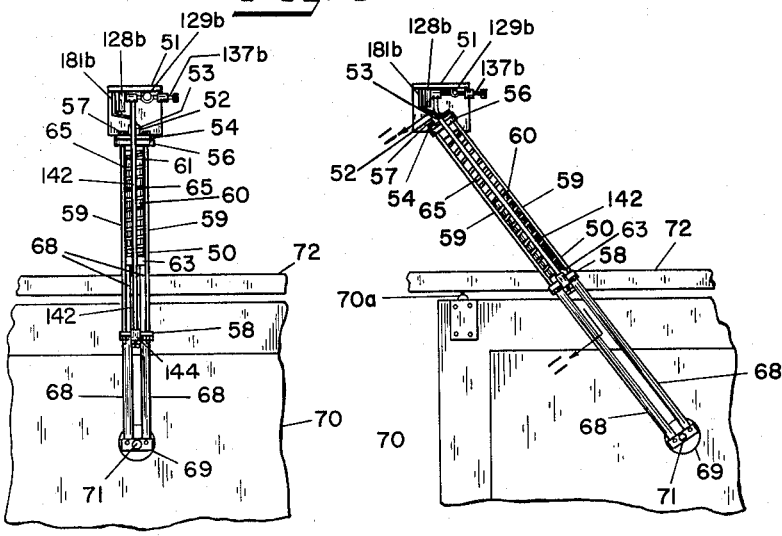
FIG. 8 is a front view of the door operator of FIG. 7 when the door is approximately at the half-way point in its travel.
FIG. 9 is a front view of the door operator of FIG. 7 when the door is open.

FIGS. 7 to 11 illustrate the operation of the over-center operator 50 in opening the door 70. In FIG. 7 the door 70 is closed and at rest. A fluid under pressure, preferably air, enters the cylinder 60 through the inlet fitting 148, manifold fluid passage 58a and piston rod passage 73, pushing the slidable cylinder 60 and its attached cap 63 upwardly. The bars 68 secured to the cap 63 are pulled upwardly, thereby causing the door 70 attached to door post 69 to slide horizontally along the track 72 toward an open position. When the door reaches approximately the halfway point in its travel, as shown in FIG. 8, the pressurized fluid is exhausted from the cylinder 60 to eliminate the force on the piston 67 and the piston rod 66. The momentum of the door 70 and the tension given the spring 65 by the movement of the over-center operator 50 to the position of FIG. 8 then complete the opening of the door. In FIG. 9 the door 70 is open and at rest. Other than being inclined in different directions, the elements of the over-center operator 50 occupy the same positions relative to each other in both FIGS. 7 and 9. The operation of the over-center operator 50 in closing the door 70 is identical to that in opening it, except that the door 70 moves in the opposite direction.

Figure 12:
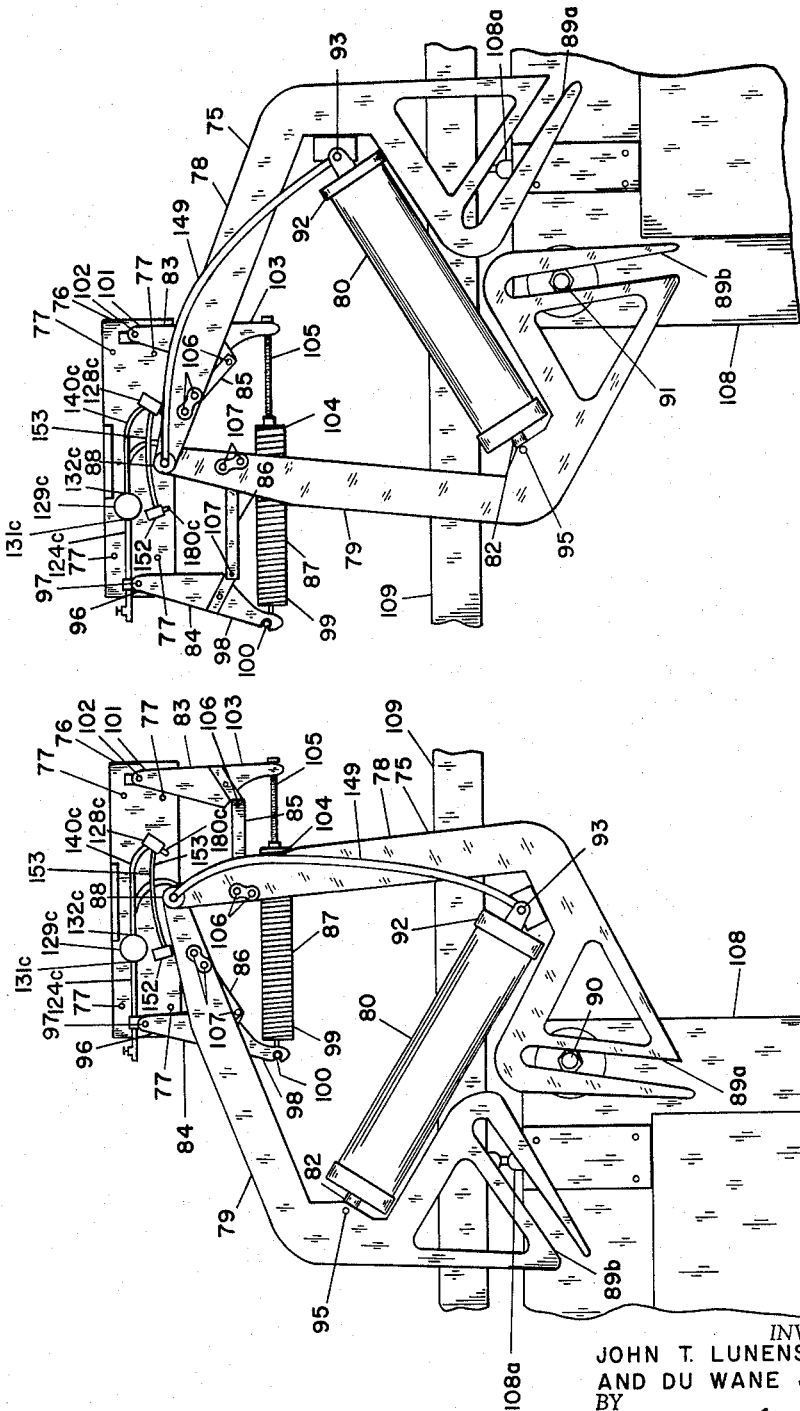
FIG. 12 is a front view of a third embodiment of an automatic door operator in its position when the door is closed.
Figure 13:
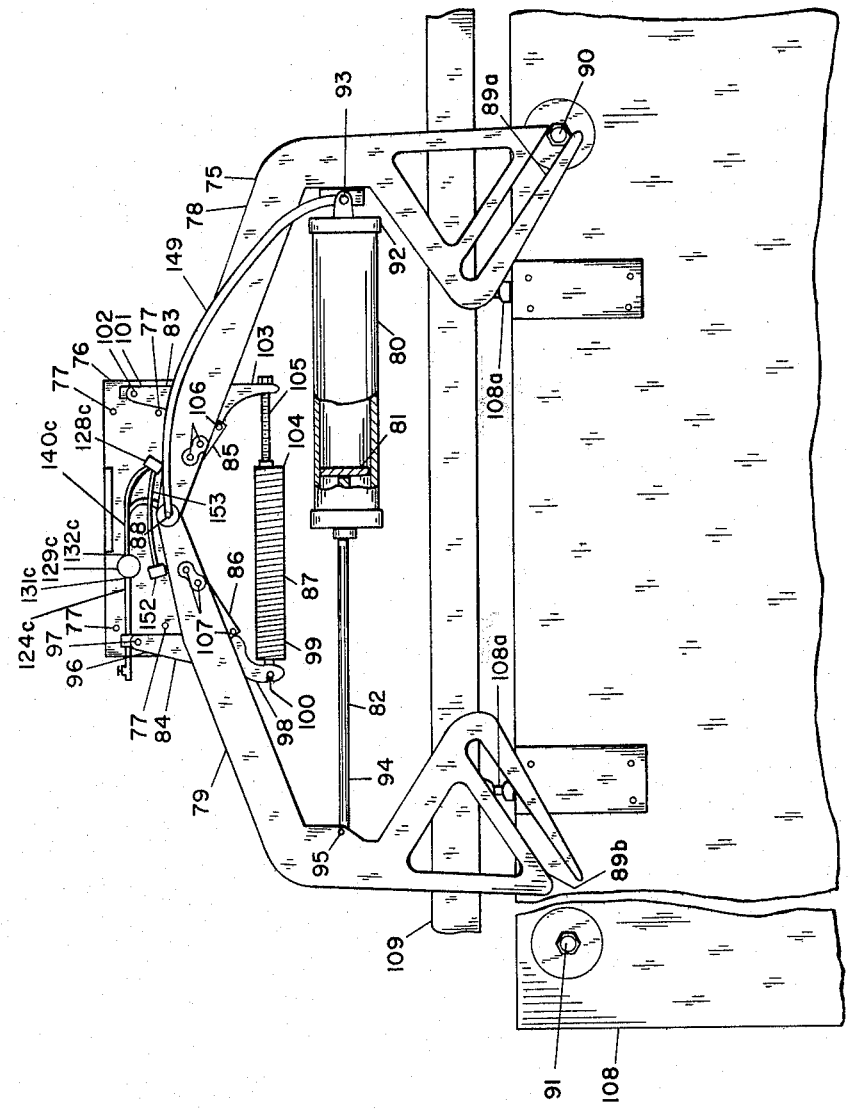
FIG. 13 is a front view, partially in vertical section, of the door operator of FIG. 12 during its operation.

Like the over-center operator 50, the inertia operator 75 shown in FIGS. 12 to 14 may be adapted to open any sliding door. The working elements of the inertia operator 75 are supported by a frame 76 which may be secured to a wall by bolts 77 or other similar means. Those working elements include a right main lever 78, a left main lever 79, a cylinder 80 encasing a piston 81 and a piston rod 82, a right and a left arm 83 and 84, a right and a left link 85 and 86, and a spring 87. The right main lever 78 and the left main lever 79 are each pivotally secured to the frame 76 by the same pin 88 or other similar means, and each has a slot 89. The slot 89a in the right main lever 78 is adapted to engage a right door post 90; the slot 89b in the left main lever 79 a left door post 91.

The right end 92 of the cylinder 80 is pivotally connected to the right main lever 78 by a pin 93 or other similar means. The left end 94 of the piston rod 82 is pivotally connected to the left main lever 79 by a pin 95 or other similar means. The upper end 96 of the left arm 84 is pivotally secured to the frame 76 by a pin 97 or other similar means, while its lower end 98 is pivotally secured to the left end 99 of the spring 87 by a pin 100 or other similar means. The upper end 101 of the right arm 83 is pivotally attached to the frame 76 by a pin 102 or other similar means, and its lower end 103 is attached to the right end 104 of the spring 87 by a screw 105 or other similar means which will allow the tension in the spring 87 to be adjusted. The right link 85 is pivotally connected to both the right arm 83 and the right main lever 78 by pins 106 or other similar means; the left link 86 is pivotally connected to both the left arm 84 and the left main lever 79 by pins 107 or other similar means. A sliding door 108, from which the right and left door posts 90 and 91 project, may be supported in slidable relation on a track 109 by means of rollers (not shown) attached to hangers 108a, or by any other suitable means.

The operation of the inertia operator 75 in opening the door 108 is illustrated in FIGS. 12 to 14. In FIG. 12 the door 108 is closed and at rest, and right door post 90 is engaged by the slot 89a in the right main lever 78. A fluid under pressure, preferably air, enters the cylinder 80 at its right end 92 and begins to push the cylinder 80 to the right, causing the right main lever 78 to begin a counterclockwise rotation about pin 88 and to exert a lateral force toward the right on the right door post 90. The door 108 is thus caused to slide horizontally along the track 109 toward an open position. When the right main lever 78 has rotated to the position shown in FIG. 13, the pressurized fluid is exhausted from the cylinder to eliminate the force on the piston 81 and piston rod 82. The momentum of the moving door 108 causes the door to continue sliding toward the open position, thereby causing right door post 90 to leave the right main lever slot 89a. The right and left main levers 78 and 79 are maintained in the position shown in FIG. 13 by the extension spring 87 and the connected right and left arms 83 and 84 and the links 85 and 86 until the left door post 91 of the moving door 108 engages the left main lever slot 89b. The momentum of the moving door 108 causes the left main lever 79 to be rotated counterclockwise on pin 88 by left door post 91 to the position shown in FIG. 14, wherein the door 108 is open and at rest. The operation of the inertia operator 75 in closing the door 108 is similar to that in opening it, except that the left main lever 79 begins the closing motion of the door, whereas the right main lever 78 begins the opening motion in the embodiment shown.

From the above description, it is obvious that a pneumatic control system for automatic door operators of the types described must:

(1) Initiate a flow of fluid under pressure to the cylinder and piston to begin the opening or closing of the door;

(2) Exhaust the pressurized fluid from the cylinder before the door has reached the end of its travel; and (3) As a preferred additional requirement, dampen the operation of the spring or door momentum to prevent slamming of the door.

Our novel pneumatic control systems quickly and surely perform these requirements.

Figure 6:
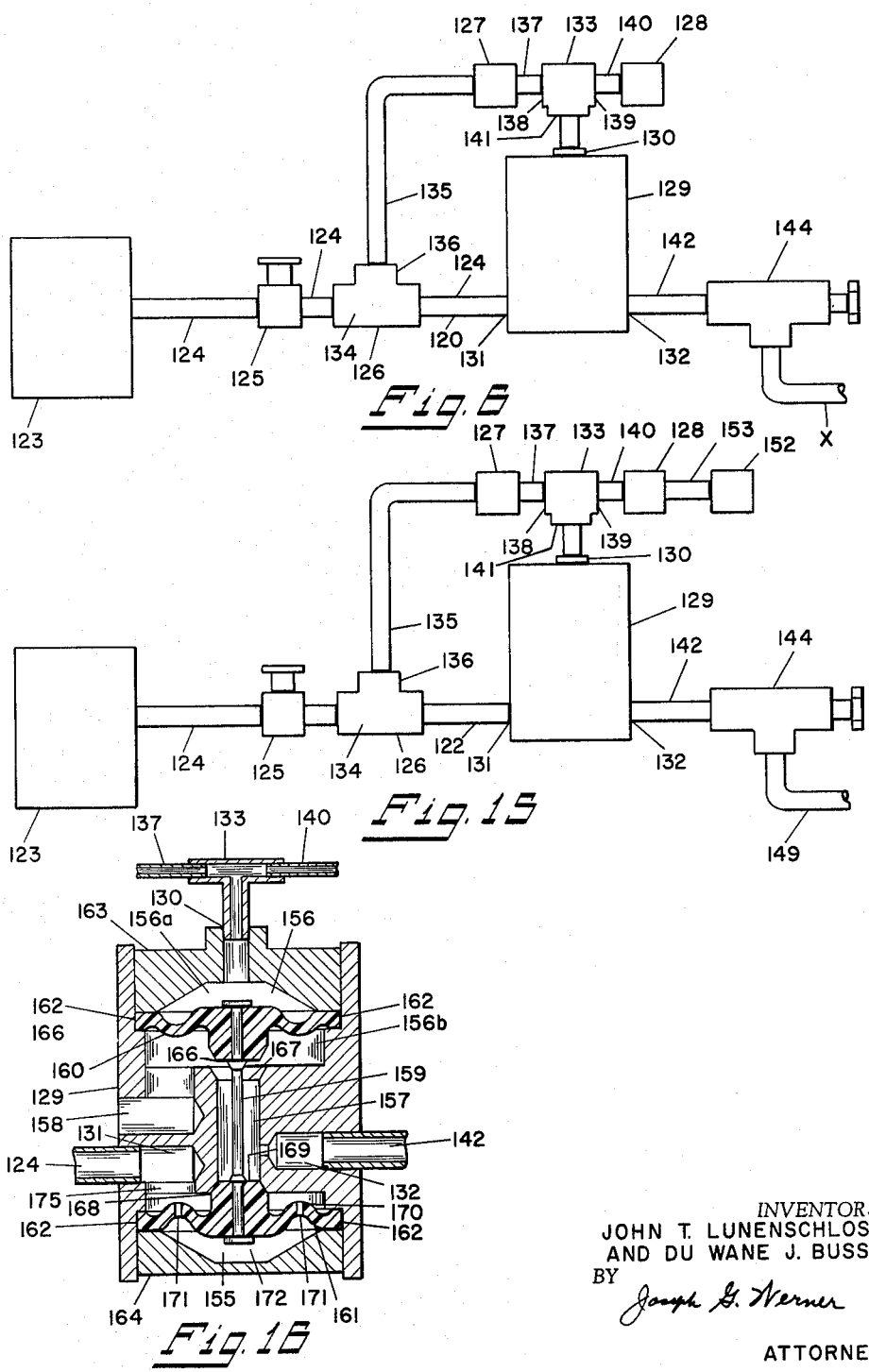
FIG. 6 is a schematic diagram of a pneumatic control system for the door operators of FIGS. 1 to 5 and FIGS. 7 to 11.

A preferred pneumatic circuit 120 for the swing operator 20 and the over-center operator 50 is schematically shown in FIG. 6 and a preferred pneumatic circuit 122 for the inertia operator 75 is schematically shown in FIG. 15. Since the circuits are basically similar, corresponding elements in each have been given the same reference numeral. The corresponding elements include a source 123 of fluid under pressure, preferably air; a main fluid line 124; a normally open needle valve 125 or other similar means to control the flow of fluid in the line 124; T-connectors or joints 126 and 133; an energizing valve or valves 127; a bleed valve 128; a combination pressure-bleed piloted control valve 129 having a pilot inlet 130, a main chamber inlet 131, an outlet 132 and an exhaust 158; an outlet line 142; and a check valve 144.

The arm 134 of the T-joint 126 is in the main fluid line 124, which is connected to the main chamber inlet 131 of the control valve 129. A line 135 connects the leg 136 of the T-joint 126 with the energizing valve or valves 127, which in turn is connected by a line 137 to one arm 138 of the T-joint 133. The other arm 139 of the T-joint 133 is connected by a line 140 to the bleed valve 128. The leg 141 of the T-joint 133 is connected to the pilot inlet 130 of the control valve 129. The outlet line 142 extends from the outlet 132 of the control valve 129 to a check valve 144.

The individual pneumatic circuits may now be examined to notice the differences among them. In the pneumatic circuit 120 of FIG. 6, a line x extends from the check valve 144. The line x schematically represents hose 145 (shown in FIGS. 1–3) when the pneumatic circuit 120 is employed with the swing operator 20; line x represents the manifold inlet fitting 148 and manifold air passage 58a (shown in FIG. 11) when the pneumatic circuit 120 is employed with the over-center operator 50. In the pneumatic circuit 122 of FIG. 15, a line 149 extends from the check valve 144. Line 149 is shown in FIGS. 12–14, and extends to the cylinder 80 of the inertia operator 75. A second bleed valve 152 is connected to the bleed valve 128 by a line 153. In the circuit 122 of FIG. 15, when both the bleed valves 128 and 152 are open, the pilot inlet 130 of the valve 129 is open to the atmosphere. If either of bleed valves 128 or 152 are closed, the pilot inlet 130 is not open to the atmosphere. In the pneumatic circuits 120 of FIG. 6, the pilot inlet 130 is open to the atmosphere when the single bleed valve 128 is open.

A detailed vertical section view of one preferred embodiment of the control valve 129 and connected elements is shown in FIG. 16. As there shown, the control valve 129 has a main chamber 155 and a pilot chamber 156 which are connected by an internal orifice 157. The pilot chamber 156 has a pilot portion 156a and an exhaust portion 156b. The pilot inlet 130 and connected T-joint 133 communicate with the pilot portion 156a; the exhaust chamber 158 communicates with the exhaust portion 156b, the valve outlet 132 and connected outlet line 142 communicate with the orifice 157; and the main chamber inlet 131 and connected main fluid line 124 communicate with the main chamber 155.

The actuating means for the control valve 129 comprises a rod 159 which fixedly carries at one end the flexible pilot chamber diaphragm 160, which separates the pilot portion 156a from the exhaust portion 156b, and at its other end the flexible main chamber diaphragm 161. The peripheries 162 of the diaphragms 160 and 161 are held in tight engagement with the walls of the chambers 155 and 156 by the plugs 163 and 164. The rod 159 extends through, and in spaced relation to, the orifice 157. As thus supported within the orifice 157 by the diaphragms 160 and 161, the rod 159 is adapted to slide back and forth within the orifice 157.

The pilot chamber diaphragm 160 has a centrally located valve shoulder 166 adjacent the valve port 167 of the orifice 157 adjacent the pilot chamber 156. The main chamber diaphragm 161 has a centrally located valve flange 168 adjacent the valve port 169 of the orifice 157 adjacent the main chamber 155. The web 170 of the main chamber diaphragm 161 has a plurality of small holes 171 which open the lower portion 172 of the main chamber 155 below the diaphragm 161 to the main chamber inlet 131.

As viewed in FIG. 16, the rod 159 and the diaphragms 160 and 161 have an "up" position and a "down" position. In the "up" position, which is that illustrated in FIG. 16, the shoulder 166 of the pilot chamber diaphragm 160 is spaced from the valve port 167 thereby opening the orifice 157 to the exhaust portion 156b of the pilot chamber 156 and the exhaust chamber 158. An exhaust path comprising the valve outlet 132, the orifice 157, the pilot chamber exhaust portion 156b and the exhaust chamber 158 is then open. In the "up" position of FIG. 16, the flange 168 of the main chamber diaphragm 161 is pushed into fluid-tight engagement with the valve port 169 to seal the main chamber 155 at the orifice 157. Fluid under pressure from the main chamber inlet 131 entering the lower portion 172 of the main chamber 155 through the holes 171 in the web 170 maintains the main chamber diaphragm 161 and connected rod 159 and pilot chamber diaphragm 160 in the "up" position of FIG. 16.

When the rod 159, and the diaphragms 160 and 161 are in the "down" position, not shown, the flange 166 of the pilot chamber diaphragm 160 is pressed into fluid-tight engagement with the valve port 167 to separate the pilot chamber 156 and the orifice 157 in fluid-tight relation. The flange 168 of the main chamber diaphragm 161 is spaced from the valve port 169 to open the main chamber 155 to the orifice 157. This permits a fluid flow through the control valve 129 by way of the main chamber inlet 131, the main chamber 155, the orifice 157 and the valve outlet 132.

For simplicity of description, the two above-described positions of the rod 159 and the diaphragms 160 and 161 are hereafter referred to as the "up" position of the control valve 129, in which the passage 175 is closed, and the "down" position, in which the passage 175 is open.

As previously mentioned, one of the functional requirements of the pneumatic control systems is exhausting the pressurized fluid from the cylinder when the door has reached the approximate midpoint of its travel. In a manner to be described in detail later, the opening of the bleed valves 128 in the pneumatic circuits 120 of FIG. 6, and the opening of both bleed valves 128 and 152 in the pneumatic circuit 122 of FIG. 15, initiate the performance of that function. Means are accordingly provided the swing operator 20, the over-center operator 50 and the inertial operator 75 to open the bleed valves at the appropriate time.

Figure 5:
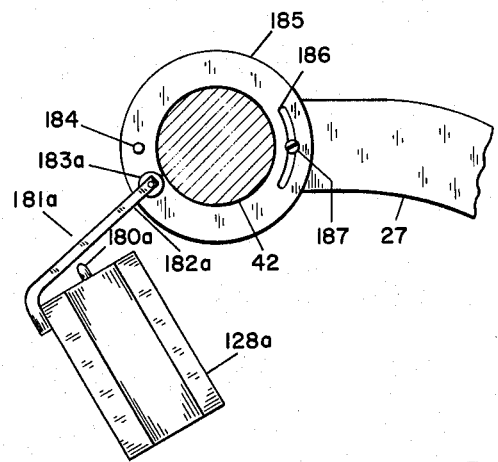
FIG. 5 is a partial section view taken along lines 5—5 in FIG. 4 and showing only a bleed valve and its operator.

A preferred means for opening the bleed valve 128 of pneumatic circuit 120 when used with the swing operator 20 is shown in FIGS. 4 and 5. Those elements of the pneumatic circuit 120 of FIG. 6 which are shown in FIGS. 1–5 are further designated by the letter "a" to avoid confusion. The bleed valve 128a which is secured to the frame 21 by any suitable means, has a plunger 180a and an actuator 181a adapted to engage and push down the plunger 180a to open the bleed valve. As shown in FIG. 5, the actuator 181a is normally pivotally attached to the body of the bleed valve 128a in spaced relation to the plunger 180a, and carries at its free end 182a a small follower wheel 183a. A timing pin 184 projects from a disc 185 which is adjustably secured to the main lever 27. The disc 185 rotates with the main lever 27 about the shaft 42. The timing pin 184 is adapted to strike the follower wheel 183a and push down the actuator 181a to thereby momentarily open the bleed valve 128a. The disc 185 is adjustable to vary the circumferential position of the pin 184 with respect to the position of the main lever 27. One preferred means for adjusting the position of the disc 185 on the main lever 27 is shown in FIG. 5. The disc 185 is maintained in the desired position with respect to the main lever 27 by a screw 187 or other threaded means which engages the main lever 27 through a slot 186 in the disc 185. The position of the main lever 27 at the time the pin 184 opens the bleed valve 128 depends upon the position of the disc 185 on the main lever 27. Preferably, the plate 185 is adjusted so that the pin 184 will open the bleed valve 128a when the door being operated reaches approximately the half-way point in its travel.

FIG. 10 illustrates a preferred means for opening the bleed valve 128 of pneumatic circuit 120 when used with the over-center operator 50. Those elements of the pneumatic circuit 120 which are shown in FIGS. 7–11 are further designated by the letter "b" to avoid confusion. The bleed valve 128b is shown in an open position in FIG. 10, with its plunger 180b depressed by the actuator 181b. The actuator 181b is moved to depress the plunger 180b by the cam 188 projecting upwardly from the bearing 52, which rotates about the shaft 53. The cam 188 is preferably positioned to momentarily open the bleed valve 128b at approximately the halfway point in the travel of the door being operated. If desired, the position of the bleed valve 128b may be made adjustable to vary the time at which it is opened.

The bleed valves of pneumatic circuit 122 for controlling the inertia operator 75 are opened directly by the left main lever 79 and the right main lever 78, respectively, as shown in FIGS. 12–14. Those elements of the pneumatic circuit 122 which are shown in FIGS. 12–14 are further designated by the letter "c" to avoid confusion. Normally closed, the bleed valves 128c and 152 for the inertia operator 75 are opened when their plungers 180c are depressed by the main levers 78 and 79. In FIG. 12, where the door 108 is closed, the bleed valve 152 is open, while the bleed valve 128c is closed. In FIG. 14, where the door 108 is open, the bleed valve 152 is closed, while the bleed valve 128c is open. But in FIG. 13, where the main levers 78 and 79 are pushed farthest apart by the cylinder 80 and piston 81, both bleed valves 128c and 152 are open.

The operation of the pneumatic circuits 120 and 122 of our invention may now be described in detail. For the purpose of convenience it will be assumed that the pressurized fluid used in the circuits is compressed air.

When the door 48 operated by the swing operator 20 is closed and at rest as shown in FIG. 1, the energizing valve 127 and the bleed valve 128 of the pneumatic circuit 120 shown in FIG. 6 are closed, and the control valve 129 is in the "up" position, wherein the passage 175 from the main chamber inlet 131 to the outlet 132 is closed. Operation of the pneumatic circuit 120 of FIG. 6 is begun by momentarily opening, either manually or by electrical means the energizing valve 127. Opening the energizing valve 127 allows a rush of compressed air to enter the pilot chamber pilot portion 156a of the control valve 129 through the pilot inlet 130. Energizing valve 127 is then closed to retain the compressed air within the pilot chamber 156. The enclosed compressed air places the control valve 129 in the "down" position, opening its passage 175. Air then flows through the passage 175, the line 142, the check valve 144 and the hose 145 (hose x in FIG. 6) to the cylinder 24. The check valve 144, which is of conventional known construction, is adapted to permit unrestricted flow to the cylinder 24, but to restrict the flow of air being exhausted from the cylinder 24. The air entering the cylinder 24 acts against the piston 26 to pivot the main lever 27 of the swing operator 20 in the manner previously described.

Referring now to FIGS. 4 and 5, the timing pin 184, which is adapted to open the bleed valve 128a, pivots with the main lever 27. At approximately the half-way point in the travel of the door 48, the timing pin 184 opens the bleed valve 128a to the atmosphere, thereby exhausting to the atmosphere the compressed air in the upper portion of the pilot chamber 156a which had placed the valve 129a in the "down" position. When the air is exhausted, the diaphragms 160 and 161 and rod 159 are again forced into the "up" position by the pressure of the compressed air in communication with the shoulder 166 of pilot chamber diaphragm 160 and the lower side of main chamber diaphragm 161. The valve passage 175 is thereby closed, and the air under pressure in the cylinder 24 is exhausted through a passage comprising the hose 145, check valve 144, line 142, and the outlet 132, orifice 157, pilot chamber exhaust portion 156b and the exhaust chamber 158 of the control valve 129. The spring 30 of the swing operator 20 and the momentum of the door 48 then complete the opening of the door to the position shown in FIG. 3.

As the door 48 completes its travel, the cylinder 24 and the piston 26 move from the extended position of FIG. 2 to the contracted position of FIG. 3. The operation of the spring 30 is dampened to prevent slamming the door 48 by the check valve 144, which partially restricts or checks the discharge of the residual air from the cylinder 24 after exhaust. The check valve 144 is preferably adjustable to vary the amount of checking.

When the door 48 is open and at rest, as shown in FIG. 3, the energizing valve 127 and the bleed valve 128 are again closed, and the control valve 129 is again in the "up" position. Manual opening of the energizing valve 127 causes the pneumatic circuit 120 and the swing operator 20 to close the door 48 in a manner similar to that in which it is opened, except that the link 31 travels in the opposite direction to the position shown in FIG. 1.

Operation of the pneumatic circuit 120 with the over-center operator 50 is similar to its above-described operation with the swing operator 20. All steps in the two operations are the same. When energizing valve 127 is momentarily opened and control valve 129 is placed in the "down" position, air flows through the passage 175, the line 142, the check valve 144, the inlet fitting 148 (hose x in FIG. 6), and the manifold air passage 58a to the cylinder 60. If desired, the check valve 144 may be integrally located within the manifold 58. Entry of air into the cylinder 60 begins the operation of the over-center operator 50 as previously described.

When the door 70 reaches approximately the half-way point in its travel, as shown in FIG. 8, the cam 188 projecting from the bearing 52 of the over-center operator 50 momentarily opens the bleed valve 128b. The opening of the bleed valve 128b exhausts to the atmosphere the compressed air retained within the pilot chamber pilot portion 156a and places the control valve 129 in the "up" position to exhaust the compressed air from the cylinder 60. The spring 65 of the over-center operator 50 and the momentum of the door 70 then complete the opening of the door to the position shown in FIG. 9. The check valve 144 restricts the outward flow of residual air accumulated in the cylinder 60 to damp the operation of the spring 65 and prevent slamming of the door 70 in a manner similar to that described for the pneumatic circuit 120. The operation of the pneumatic circuit 120 with the over-center operator 50 to close the door 70 is similar to its operation in opening the door except that the door travels in the opposite direction.

While the operation of the pneumatic circuit 122 for the inertia operator 75 shown in FIGS. 12–14 is basically the same as that for the pneumatic circuit 120, elaboration on the operation is necessary because the circuit 122 has two bleed valves, rather than one as in circuit 120. Before operation of the circuit 122 of FIG. 5 is commenced, the door 108 is closed and at rest, as shown in FIG. 12, the energizing valve 127 is closed, the bleed valve 152 is open, the bleed valve 128c is closed and the control valve 129 is in the "up" position. Momentary opening of the energizing valve 127 places the control valve 129 in the "down" position and opens its passage 175, as is fully discussed in the description of the operation of the pneumatic circuit 120. Air then flows through the passage 175, the line 142, the check valve 144 and the hose 149, to the cylinder 80. Entry of air into the cylinder 80 begins to pivot the right main lever 78 of the inertia operator 75 in the way previously described.

When the door 108 reaches the point in its travel shown in FIG. 13 wherein the right door post 90 is about to leave the right main lever slot 89a, the right main lever 78 has sufficiently pivoted to open the bleed valve 128c. The left main lever 79 is still in a position to hold open the bleed valve 152. The pilot chamber 156a of the control valve 129 is thus open to the atmosphere through a passage comprising the open bleed valve 152, the line 153, the open bleed valve 128c, the line 140, the T-joint 133 and the pilot chamber inlet 130. The compressed air which entered the pilot chamber pilot portion 156a when the energizing valve 127 was momentarily opened, and which placed the control valve 129 in the "down" position with its passage 175 open, is thus exhausted to the atmosphere. The control valve 129 is again placed in the "up" position to exhaust the air from the cylinder 80. The right and left main levers 78 and 79, respectively, are maintained in the extended positions shown in FIG. 13 by the spring 87 and the connected right and left arms 83 and 84 and links 85 and 86 until the left door post 91 of the moving door 108 engages the left main lever slot 89b. The momentum of the moving door causes the left main lever 79 to be rotated counterclockwise to the position of FIG. 14, wherein the door 108 is open and at rest.

As the door 108 completes its opening, the left main lever 79 pivots away from the bleed valve 152 to close the valve. The right main lever 78 continues to hold the bleed valve 128c open. When the door 108 is in the open and at rest position of FIG. 14, therefore, the energizing valve 127 is closed, the bleed valve 152 is closed, the bleed valve 128c is open and the control valve 129 is in the "up" position.

When the energizing valve 127 is momentarily opened to start the operation of the pneumatic circuit 122 and the inertia operator 75 to close the door 108, the left main lever 79 begins to pivot clockwise. At the point in the travel of the door 108 shown in FIG. 13, the left main lever 79 has sufficiently pivoted to open the bleed valve 152. Both bleed valves 128c and 152 are now open. The air in the pilot chamber 156a of the control valve 129 is thereby exhausted to the atmosphere in the manner previously described for the opening of the door 108, thereby causing the control valve 129 to move to the "up" position and permit the exhaust of compressed air from the cylinder 80. The momentum of the door 108 then completes the closing of the door in the same manner as described above with respect to opening the door. The check valve 144 partially restricts the exhaust of compressed air from the cylinder 80 to prevent slamming of the door 180 during both opening and closing.

It is, of course, obvious that it is understood that our invention is not confined to the particular construction and arrangement of parts herein illustrated and described, but embraces all such modified forms thereof as come within the scope of the following claims.

We claim:

1. A control system for an automatic door operator having two positions corresponding to open and closed positions, respectively, for an associated door operated thereby, said control system comprising:

(a) a fluid-operated piston located in reciprocable relation within a cylinder, (b) said piston and said cylinder being connected to said door operator such that when pressurized fluid is supplied to said cylinder said piston and said cylinder will initiate movement of said door operator from one of its said positions to the other said position, and such that said piston will exhaust said pressurized fluid from said cylinder during completion of the movement of said operator to said other position, (c) spring means connected to said door operator to cause said operator to complete its movement to said other position, (d) a source of fluid under pressure, (e) a control valve having an inlet in communication with said fluid source, an outlet in communication with said cylinder and said piston, an exhaust in communication with the atmosphere and a pilot chamber having a pilot inlet, (f) valve means located within said control valve, (g) said valve means having a first position wherein said valve means permits the passage of fluid from said fluid source to said cylinder and piston and prevents the passage of fluid to said exhaust, and having a second position wherein said valve means prevents the passage of fluid from said fluid source to said cylinder and piston and permits the flow of fluid from said cylinder to said exhaust, (h) a normally closed energizing valve in communication with said source of fluid under pressure and said pilot inlet for selectively allowing said pressurized fluid to enter said pilot chamber when said energizing valve is momentarily opened, (i) at least one normally closed de-energizing valve means in communication with said pilot inlet and with the atmosphere to exhaust said pressurized fluid from said pilot chamber to the atmosphere when said de-energizing valve means is opened, (j) fluid-responsive actuating means fixedly attached to said control valve to cause movement of said valve means to its said first position when said energizing valve is opened to allow a quantity of pressurized fluid to enter said pilot chamber, and to cause movement of said valve means to its said second position when said de-energizing valve means is opened to exhaust said pressurized fluid from said pilot chamber, and (k) means associated with said door operator for opening said de-energizing valve when said door operator reaches the approximate midpoint of its travel from one of its said positions to the other of said positions.

2. The invention described in claim 1 wherein said de-energizing valve means comprises a first bleed valve and a second bleed valve, said bleed valves being connected in series such that both bleed valves must be open to permit the pressurized fluid in the pilot chamber to be exhausted to the atmosphere.

3. The invention described in claim 1 wherein a check valve is located between said control valve outlet and said cylinder, said check valve being adapted to permit unrestricted flow of fluid under pressure from said control valve to said cylinder, and to restrict the flow of such fluid from said cylinder to said control valve.

References Cited by the Examiner

UNITED STATES PATENTS

| | | | |
|---|---|---|---|
| 1,657,544 | 1/1928 | Schoelkopf | 268—50 |
| 1,716,707 | 6/1929 | Schoelkopf | 268—64 |
| 2,380,334 | 7/1945 | Schoelkopf | 268—50 |
| 2,758,835 | 8/1956 | Wikkerink | 268—34 |
| 2,810,571 | 10/1957 | Ferguson et al. | 268—34 |

REINALDO P. MACHADO, *Primary Examiner.*

HARRISON R. MOSELEY, *Examiner.*

J. K. BELL, *Assistant Examiner.*